(No Model.)
G. T. CLARK.
SOCKET FOR FENCE POSTS.
No. 275,801. Patented Apr. 17, 1883.
Fig. 1.
Fig. 2.
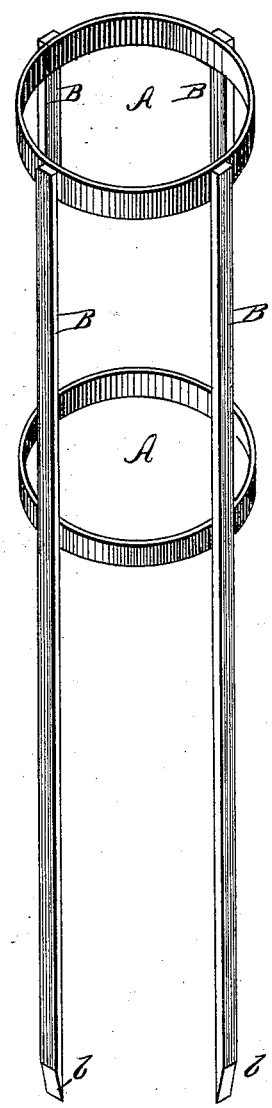
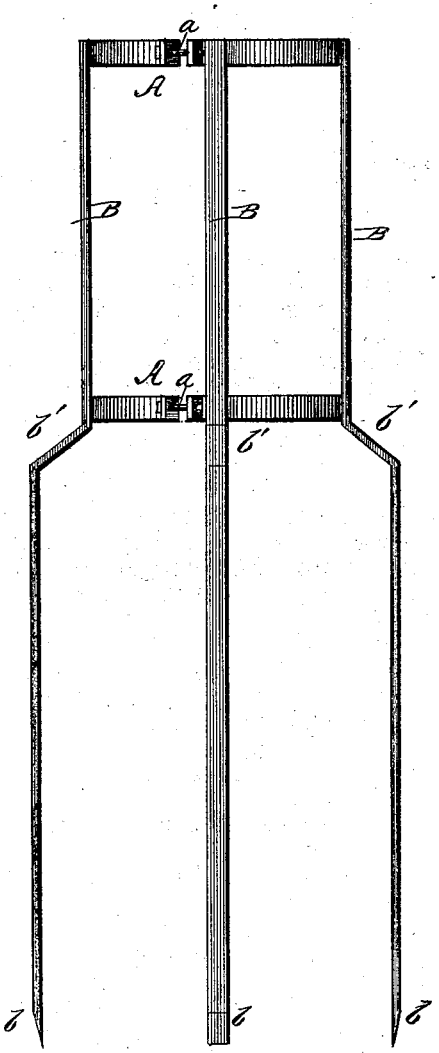
Witnesses:
C. L. Carman.
W. C. McArthur.
Inventor.
George T. Clark
Per
J. E. Stevenson
Attorney.

UNITED STATES PATENT OFFICE.

GEORGE T. CLARK, OF DELMAR, IOWA.

SOCKET FOR FENCE-POSTS.

SPECIFICATION forming part of Letters Patent No. 275,801, dated April 17, 1883.

Application filed November 8, 1882. (No model.)

*To all whom it may concern:*

Be it known that I, GEORGE T. CLARK, a citizen of the United States of America, residing at Delmar, in the county of Clinton and State of Iowa, have invented an Improvement in Sockets for Fence-Posts, of which the following is a specification, to wit:

This invention relates to sockets for fence-posts which will not rot, will be cheap and simple in construction, and will be securely held in the ground when driven; and to this end it consists in one or more rings or tubes, to which are secured four wrought-iron feet or arms having their lower ends beveled, as will be hereinafter more fully explained.

In order to enable others skilled in the art to which my invention appertains to make and use the same, I will now proceed to describe its construction and operation, referring to the accompanying drawings, in which—

Figure 1 is a perspective view of my socket constructed with closed rings and straight feet; and Fig. 2 is a similar view, formed with open rings and bent legs.

A represents two metal rings, forming the socket for a fence-post, and may be formed closed and of a size to fit a post of given diameter, as seen in Fig. 1; or they may be made open, as seen by Fig. 2, and provided with a fastening-bolt, $a$, by which they may be varied to suit several different sizes of post, and may also be more tightly fitted. To these rings A are secured four wrought-iron bars, B, forming feet, which extend a suitable distance below the socket, and are on their lower ends beveled, as seen at $b$. When these feet are driven into the ground they will be spread apart or drawn together, according as they are beveled on the inside or outside, and will thereby be more firmly locked in position and make a firmer socket. In order to form a broader base and prevent the settling of the socket, I also form the legs B with an angular bend, as seen in Fig. 2 at $b'$, which rests upon the ground when driven.

Having thus fully described my invention, what I claim as new, and desire to secure by Letters Patent, is—

A post base or socket, consisting of one or more open rings adapted to be tightened or closed by a bolt, and provided with wrought-iron feet having one side of their lower extremities beveled, whereby they will be either spread apart or forced together when driven, substantially as and for the purpose set forth.

In testimony whereof I affix my signature in presence of two witnesses.

GEORGE T. CLARK.

Witnesses:
 A. C. CONERY,
 R. L. DAWSON.